(12) United States Patent
Billings (10) Patent No.: US 10,010,926 B2
(45) Date of Patent: Jul. 3, 2018

(54) METHOD FOR FILLING, SEAMING, DISTRIBUTING AND SELLING A BEVERAGE IN A METALLIC CONTAINER AT A SINGLE LOCATION

(71) Applicant: Ball Corporation, Broomfield, CO (US)

(72) Inventor: James W. Billings, Boulder, CO (US)

(73) Assignee: Ball Corporation, Broomfield, CO (US)

( * ) Notice: Subject to any disclaimer, the term of this patent is extended or adjusted under 35 U.S.C. 154(b) by 1064 days.

(21) Appl. No.: 14/297,163

(22) Filed: Jun. 5, 2014

(65) Prior Publication Data

US 2015/0113921 A1    Apr. 30, 2015

Related U.S. Application Data

(60) Provisional application No. 61/896,516, filed on Oct. 28, 2013.

(51) Int. Cl.
| | |
|---|---|
| *G06Q 30/06* | (2012.01) |
| *B21D 51/30* | (2006.01) |
| *G06Q 10/08* | (2012.01) |
| *G06Q 50/12* | (2012.01) |
| *G07F 13/06* | (2006.01) |

(52) U.S. Cl.
CPC ........... *B21D 51/30* (2013.01); *G06Q 10/087* (2013.01); *G06Q 30/0621* (2013.01); *G06Q 50/12* (2013.01); *G07F 13/065* (2013.01)

(58) Field of Classification Search
CPC ................... G06Q 30/06–30/08; B21D 51/30

USPC .............................................. 705/26.1–27.2
See application file for complete search history.

(56) References Cited

U.S. PATENT DOCUMENTS

| | | |
|---|---|---|
| 2,291,604 A | 8/1942 | Baselt |
| 2,600,391 A | 6/1952 | Cabot |
| 3,030,900 A | 4/1962 | Munschauer et al. |
| 3,354,614 A | 11/1967 | St. Clair et al. |
| 3,452,695 A | 7/1969 | Anthony |
| 3,533,211 A | 10/1970 | Einnehemer |
| 5,027,580 A | 7/1991 | Hymes et al. |
| 5,066,580 A | 11/1991 | Lee |
| 5,320,469 A | 6/1994 | Katou et al. |

(Continued)

FOREIGN PATENT DOCUMENTS

| | | |
|---|---|---|
| AU | 2011203534 | 1/2013 |
| AU | 2012267897 | 4/2016 |

(Continued)

OTHER PUBLICATIONS

7 Delicious Mail-Order Snacks You Can Get Custom Made, Emily Fleischaker, Oct. 2, 2013, available at: https://www.buzzfeed.com/emofly/custom-made-snacks?utm_term=.mvKje5YvW#.mxklo6r9D (Year: 2013).*

(Continued)

*Primary Examiner* — Ming Shui
(74) *Attorney, Agent, or Firm* — Sheridan Ross PC (57) ABSTRACT

A method is provided wherein a metallic container is filled with a consumer identified beverage, seamed to a metallic end closure, distributed, and sold to the consumer. Thus, a consumer has influence and control over volume, qualities, and size of the beverage along with specific characteristics regarding the size and shape of the metallic container.

14 Claims, 7 Drawing Sheets

(56) References Cited

U.S. PATENT DOCUMENTS

| | | | |
|---|---|---|---|
| 5,555,992 A | | 9/1996 | Sedgeley |
| 5,566,066 A | * | 10/1996 | Weitzman ............ G06Q 10/087 399/51 |
| 6,519,919 B1 | | 2/2003 | Takenouchi et al. |
| 7,399,152 B2 | | 7/2008 | Domijan |
| 7,756,604 B1 | | 7/2010 | Davis et al. |
| 7,819,729 B2 | | 10/2010 | Rohrer et al. |
| 8,126,589 B1 | | 2/2012 | Parker |
| 8,313,004 B2 | | 11/2012 | Stodd et al. |
| 8,757,953 B2 | | 6/2014 | Fields et al. |
| 9,054,818 B2 | | 6/2015 | Wang |
| 9,058,341 B2 | | 6/2015 | Ramsey et al. |
| 9,085,026 B2 | | 7/2015 | Mejia-Quinchia et al. |
| 9,221,666 B2 | | 12/2015 | Vandekerckhove et al. |
| 2004/0159697 A1 | * | 8/2004 | Turner ............... B21D 51/2653 228/124.6 |
| 2007/0265935 A1 | | 11/2007 | Woycik et al. |
| 2008/0004973 A1 | * | 1/2008 | Rothschild ........... B67D 1/0041 705/14.46 |
| 2008/0183489 A1 | * | 7/2008 | Kopelman ............ G06Q 30/02 705/26.1 |
| 2009/0205747 A1 | * | 8/2009 | Lillard, Jr. ........... B67D 1/0888 141/94 |
| 2009/0242074 A1 | | 10/2009 | Carrig |
| 2012/0315111 A1 | | 12/2012 | Mejia-Quinchia et al. |
| 2013/0240617 A1 | | 9/2013 | Ramsey et al. |
| 2013/0246136 A1 | | 9/2013 | Ramsey et al. |
| 2014/0321949 A1 | | 10/2014 | Mejia-Quinchia et al. |
| 2016/0001347 A1 | | 1/2016 | Hollingsworth et al. |
| 2016/0016223 A1 | | 1/2016 | Wilkinson et al. |
| 2016/0292697 A1 | | 10/2016 | Ramsey et al. |

FOREIGN PATENT DOCUMENTS

| | | |
|---|---|---|
| BR | PI1103572 | 8/2015 |
| CA | 2867218 | 9/2013 |
| CA | 2867453 | 9/2013 |
| CN | 104756146 | 7/2015 |
| CN | 105451909 | 3/2016 |
| EP | 2562129 | 2/2013 |
| EP | 2718038 | 1/2015 |
| EP | 2146907 | 5/2016 |
| ES | 2567262 | 4/2016 |
| WO | WO 2011/053776 | 5/2011 |
| WO | WO 2011/131796 | 10/2011 |
| WO | WO 2012/170635 | 12/2012 |
| WO | WO 2013/045263 | 4/2013 |
| WO | WO 2013/135899 | 9/2013 |
| WO | WO 2013/138595 | 9/2013 |
| WO | WO 2014/115073 | 7/2014 |
| WO | WO 2014/143820 | 9/2014 |

OTHER PUBLICATIONS

Official Action for New Zealand Patent Application No. 719015, dated Mar. 21, 2017 5 pages.
International Search Report and Written Opinion for International (PCT) Patent Application No. PCT/US2014/059832, dated Jan. 21, 2015 8 pages.
International Preliminary Report on Patentability for International (PCT) Patent Application No. PCT/US2014/059832, dated May 12, 2016 7 pages.
Official Action for Australia Patent Application No. 2014342865, dated Jan. 13, 2017 5 pages.
Official Action for Canada Patent Application No. 2,927,589, dated Jan. 27, 2017 3 pages.
Official Action for New Zealand Patent Application No. 719015, dated Aug. 9, 2016 4 pages.
Notice of Acceptance for Australia Patent Application No. 2014342865, dated Sep. 7, 2017 3 pages.
Notice of Allowance for Canada Patent Application No. 2,927,589, dated Oct. 24, 2017 1 page.
Extended Search Report for European Patent Application No. 14858929.4, dated Nov. 20, 2017 11 pages.
Official Action for New Zealand Patent Application No. 719015, dated Aug. 1, 2017 4 pages.

\* cited by examiner

METHOD FOR FILLING, SEAMING, DISTRIBUTING AND SELLING A BEVERAGE IN A METALLIC CONTAINER AT A SINGLE LOCATION

CROSS REFERENCE TO RELATED APPLICATIONS

This application claims priority under 35 U.S.C. § 119(e) to U.S. Provisional Patent Application Ser. No. 61/896,516 filed Oct. 28, 2013, which is incorporated herein in its entirety by reference.

FIELD OF THE INVENTION

Embodiments of the present invention generally relate to metallic containers and metallic container end closures; and more specifically to methods of filling a metallic container with a beverage, seaming a metallic container end closure to the metallic container, then distributing and selling the beverage-filled metallic containers.

BACKGROUND OF THE INVENTION

The traditional process of filling, seaming, distributing, and selling a beverage-filled container takes place at many locations. In a typical scenario, a vendor manufactures containers and container end closures at a manufacturing facility. Then, the vendor ships the containers and container end closures to a filler. At the filler's location, the metallic containers are filled with a predetermined amount of a beverage, and the container end closure is double seamed to the container. Next, the filler sends the beverage-filled containers into a distribution network whereby third parties handle the logistics of transporting the beverage-filled containers to retailers. This may include many stops at shipping ports, railroads, warehouses, etc. Only when the beverage-filled container reaches a licensed retailer such as a liquor store or a grocery store does a consumer actually buy the beverage-filled container.

One shortcoming with this traditional process is that the consumer has no influence or control over the filling, seaming, or distributing of the beverage-filled container. Rather, the consumer simply purchases the container at the end of the process. In addition, during the extensive process of transporting the filled container, the beverage may be excessively over-heated and shaken, thus compromising the taste of the beverage. Therefore, the consumer cannot influence the amount, content, or other aspects of the beverage, nor the size and ornamental shape of the container.

A "growler" is a container that allows some input by the consumer during the process of filling and distributing a beverage-filled container. A growler is a reusable container that is typically made from glass and comprises a closure. The closure is typically a metal structure that both grips the glass container and presses a rubber seal into an opening in the glass body of the growler. Growlers have become increasingly popular in the craft beer brewing market. In a typical craft brew scenario, a consumer brings a reusable growler to a craft brewery, or alternatively, purchases a growler at the brewery. Next, the consumer selects a specific type of beverage. The growler is subsequently filled (often by the consumer), the closure is sealed to the bottle, and the consumer takes the beverage-filled growler home, to a picnic, sporting event, etc.

However, growlers have several disadvantages. First, growlers are difficult to recycle because they are comprised of several materials. Most growlers are glass and have tops constructed from metal, rubber, and other materials. To properly recycle a growler, a consumer would have to obtain tools to disassemble the various components of the growler. Further, growlers may not be used in areas where glass is prohibited. Due to the breakable nature of glass, glass containers are prohibited at many events because of safety concerns. Growlers are also heavy and are generally, significantly more expensive than metallic containers.

Growlers additionally have a poor shelf life due to their construction. As mentioned above, the top of a growler has a metal structure that presses a rubber seal into an opening in the glass body of the growler. This seal is not as durable or high quality as the seal of a conventionally manufactured metallic container where a container end closure is seamed onto the neck of the container. Further, repeated use of a reusable growler over time can degrade the quality of the seal.

Although the growler is reusable and thus used repeatedly, this increases the likelihood of contamination as a result of improper cleaning and sterilization. Mouth contact with the opening of a growler can easily transfer bacteria to the beverage or foodstuff which can subsequently contaminate both the growler and the beverage or foodstuff. Contamination will cause bacterial and fungal growth in the beverage while kept in storage.

Due to the numerous limitations associated with the prior art described above, the following disclosure describes an improved method to fill a metallic container, seam a metallic container end closure to the metallic container, then purchase the filled metallic container.

SUMMARY OF THE INVENTION

The above needs and other needs are addressed by the various embodiments and configurations of the present invention. This invention relates to a novel method to fill, double seam, and purchase a beverage in a metallic container.

It is one aspect of the present invention to provide a method for filling, seaming, and selling a beverage in a metallic container wherein a consumer influences and controls the various qualities and aspects of the beverage and the size and shape of the metallic container. In some embodiments, the consumer can direct an attendant to personally fill the metallic container with a particular type of beverage and volume. A person who is skilled in the art will appreciate that the beverage qualities and aspects that the consumer influences and controls are not limited to type and amount, but may also include qualities such as alcohol content, combinations of beverages, temperature, etc. Further, the size of the metallic container could vary from a traditional 12 oz can to a 16 oz, 32 oz or even a small keg of 1 to 5 gallons.

It is further aspect of the present invention to provide a method for filling, seaming, distributing, and selling a beverage in a metallic container wherein the metallic container and the metallic container end closure are easily recyclable after consumption of the beverage. A container and container end closure may be comprised primarily of metal such that the container does not require disassembly to be easily recycled at any location where metal is recycled.

It is another aspect of the present invention to provide a method for filling, seaming, distributing, and selling a beverage in a metallic container wherein the beverage in the metallic container has a superior shelf life when compared to other containers such as bottled beverages with threaded caps. After the metallic container is filled with a beverage, the metallic container end closure is seamed onto the metallic container. In one embodiment of the present invention, an attendant or the consumer may use a seamer to form a double seam between the peripheral curl of the metallic container end closure and the neck of the metallic container. The double seaming apparatus can be powered by manual force, or utilize electric, pneumatic, or hydraulic energy to form the double seam. The seaming apparatus creates a double seam between the metallic container end closure and the metallic container which hermetically seals the beverage or foodstuff in the metallic container.

It is a further aspect of the present invention to provide a method for filling, seaming, distributing, and selling a beverage in a metallic container wherein the metallic container is less prone to contamination. The present invention is disposable in nature, not reusable. Therefore, a consumer does not risk contamination of the metallic container, metallic container end closure, or the beverage or foodstuffs which is associated with repeated uses.

It is an aspect of the present invention to provide a method for selecting a container and contents thereof, filling seaming, distributing, and selling the beverage-filled where a user controls the location where certain steps or actions are performed. In accordance with some embodiments, the steps or actions of selecting a container and the beverage or foodstuffs that go into the container may be performed at the same location where the filling, seaming, distributing, and selling steps or actions are performed. In other embodiments, the selecting of the container and its contents may be performed at other locations. For example, a consumer may use an application on his or her phone to prompt an attendant to begin filling and seaming a particular container and its contents, then the consumer may complete the remaining steps of distribution and sale at the location where the filling and seaming is located.

It is an aspect of the present invention to provide a method for selecting a container and contents thereof, filling seaming, distributing, and selling the beverage-filled container wherein an electronic device is tailored to perform or aid in the performance of some steps or actions of the present invention. For example, an electronic device such as a computer interface or touch screen may be in communication with an attendant, seamer, or other electronic device such that a user may perform some or all of the steps or actions of the present invention. Further, an electronic device may keep track of available content options such as beverages or foodstuffs, inventory, consumer trends, receiving data from a central or decentralized network, or any other task commonly delegated to electronic devices.

It is an aspect of the present invention to provide a method for selecting a container and contents thereof, filling seaming, distributing, and selling the beverage-filled container wherein a quick selection feature is provided on an electronic device. As described elsewhere herein, an electronic device may acquire data from user selections over time, a network, a server, or any other source. This data may include parameters such as popular consumer selections, time of day or year, weather conditions, etc. Based on a variety of data, the quick selection feature may generate one or more content selections for a user on a computer interface such as a touch screen. This allows a user to more easily select a particular beverage or foodstuff without having to navigate various categories of contents, etc.

It is an aspect of the present invention to provide a method for selecting a container and contents thereof, filling seaming, distributing, and selling the beverage-filled container wherein an individualized content and/or container profile for a consumer is provided. The electronic device may acquire aggregate consumer data, and it may also acquire individual consumer data. A computing database may assign attributes to the various beverages and track beverages selections over time and tally the attributes of these beverages. The electronic device may access databases of individual consumer data to determine an individual's preferences. Then, the electronic device may supply a recommendation based upon those preferences, wherein the recommendation may be for an entirely new product or a modification of one of the individual's preferred products.

A particular embodiment of the present invention is a method for producing, filling, and selling a container with a foodstuff at a single location, comprising 1) receiving a selection, from a consumer, of contents; 2) providing a metallic container and a metallic container end closure; 3) filling the metallic container with the selected contents; 4) seaming the metallic container end closure to the metallic container to create the filled container; 5) distributing the filled container to the consumer; and 6) selling the filled container to the consumer.

Another particular embodiment of the present invention is a method for producing, filling, and selling a container filled with a beverage, comprising 1) manufacturing, at a second location, a metallic container and a metallic end closure; 2) selecting, at a first location by a consumer, a specific beverage; 3) selecting, at the first location by the consumer, the metallic container; 4) filling, at the first location, the metallic container with the specific beverage; 5) seaming, at the first location, the metallic end closure to the metallic container to create a filled container; 6) distributing, at the first location, the filled container to the consumer; and 7) selling, at the first location, the filled container to the consumer.

Another embodiment of the present invention is a system for selecting, choosing, filling, and seaming a foodstuff in a metallic container, comprising: a first electronic device at a first location, wherein a user selects the foodstuff and the metallic container via the first electronic device; a second electronic device at a second location, wherein the first electronic device transmits the user selections to the second electronic device at the second location; a seamer and an attendant at the second location, wherein the attendant receives user selections via the second electronic device, the attendant fills the metallic container with the foodstuff, seams an end closure onto the metallic container with the seamer, and distributes and sells the metallic container to the user at the second location.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|---|---|
| 2 | End Closure |
| 4 | Center Panel |
| 6 | Countersink |
| 8 | Chuck Wall |
| 10 | Peripheral Curl |
| 12 | Countersink Radius |
| 14 | Chuck Wall Radius |
| 16 | Peripheral Curl Radius |
| 18 | Container Body |
| 20 | Neck |
| 22 | Chuck |
| 24 | First Surface |
| 26 | Second Surface |
| 28 | Third Surface |
| 30 | First Roller |
| 32 | First Roller Radius |
| 34 | Second Roller |
| 36 | Second Roller Radius |
| 38 | Double Seam |
| 40 | Consumer Entrance |
| 42 | First Location |
| 44 | Content Selection |
| 46 | Container Selection |
| 48 | Container Fill |
| 50 | Container Seam |
| 52 | Container Distribution/Sale |
| 54 | Consumer Exit |
| 56 | Content Consumption |
| 58 | Container Disposal |
| 60 | Second Location |
| 62 | Electronic Device |
| 64 | Input Database |
| 66 | Inventory Database |
| 68 | Consumer Database |
| 70 | Transceiver |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present invention are described herein and as depicted in the drawings. It is expressly understood that although the figures depict metal end closures, container bodies, seamers, and methods and systems for using the same, the present invention is not limited to these embodiments. It should also be understood that the terms "container" and "container body", "beverage" and "foodstuff", "end closure" and "container end closure", and "seamer" and "seaming apparatus" may be used interchangeably in some instances.

Figure 1:
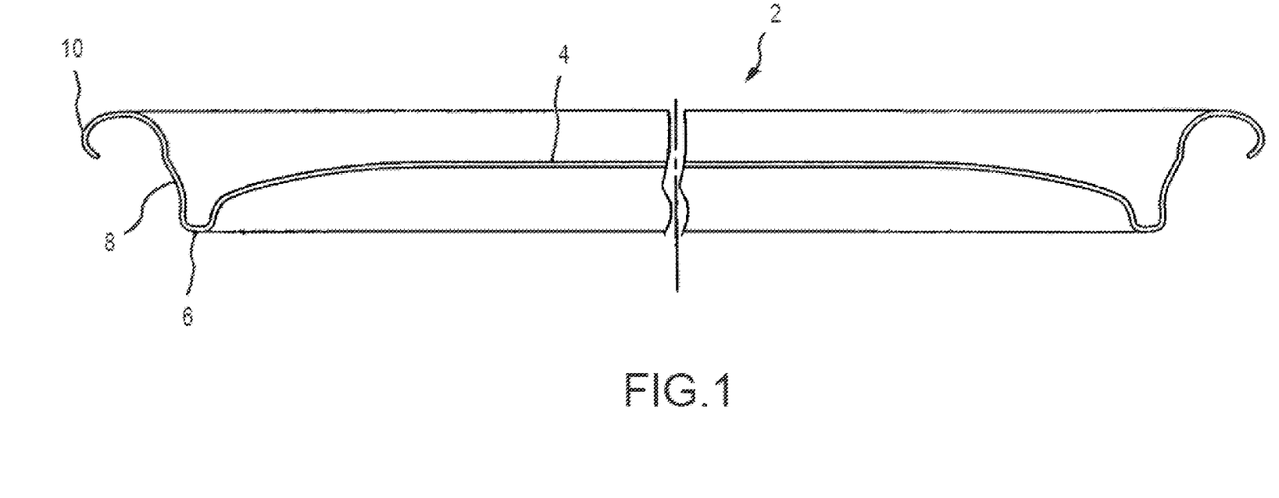
FIG. 1 is a side elevation view of a metallic end closure with a peripheral curl.

Some embodiments of the present invention include seaming together an end closure and a container body to form a hermetically sealed container. FIGS. 1-4 depict a typical double seaming apparatus and process. Referring now to FIG. 1, a side elevation view of an end closure 2 is illustrated. The end closure 2 comprises a central panel 4, which spans the majority of the end closure 2. Not illustrated in FIG. 1 are rivets, pull tabs, debossed areas, tear panels, and other features which may be found on the end closure 2. Such features are described in U.S. Pat. No. 8,567,158, which is incorporated herein in its entirety by reference. In this embodiment, the end closure 2 and the central panel 4 are generally circular in shape. The outer edge of the central panel 4 extends toward the inner wall of a countersink 6, which comprises the inner wall, a bottom, and an outer wall. The inner and outer wall of the countersink 6 may be generally parallel, and the bottom of the countersink 6 may be generally flat. The outer wall of the countersink 6 extends upwardly into a chuck wall, which in turn extends upwardly and outwardly into a peripheral curl 10.

Figure 2:
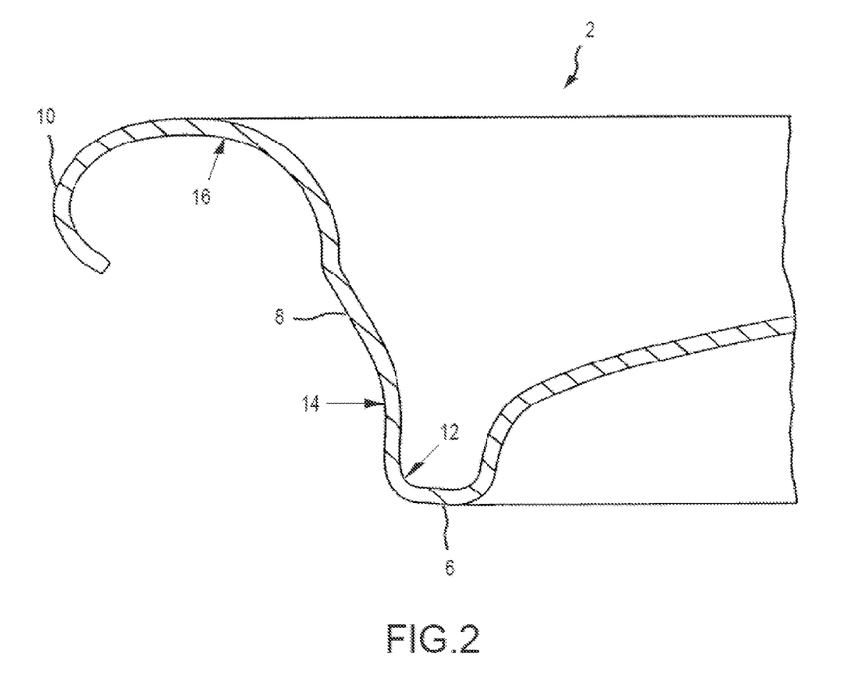
FIG. 2 is a detailed side elevation view of the metallic end closure of FIG. 1.

Referring now to FIG. 2, a detailed view of the countersink 6, the chuck wall 8, and the peripheral curl 10 is provided. These components of the end closure 2 may have a wide range of shapes and geometries. For example, a countersink radius 12 may be disposed between the bottom of the countersink 6 and the outer wall of the countersink 6 wherein the countersink radius 12 may have a radius of curvature of approximately 0.010 inches. Similarly, the chuck wall 8 generally has a frusto-conical shape, but the chuck wall 8 may not be planar as illustrated in FIG. 2. The chuck wall 8 may have a chuck wall radius 14. In this embodiment, the chuck wall radius 14 may have a radius of curvature of approximately 0.054 inches. A portion of the peripheral curl 10 may also have a peripheral curl radius 16, which may have a radius of curvature of approximately 0.070 inches. A more detailed exemplar of possible end closure 2 geometries may be found in U.S. Pat. No. 8,313,004, which is incorporated herein in its entirety by reference.

Figure 3:
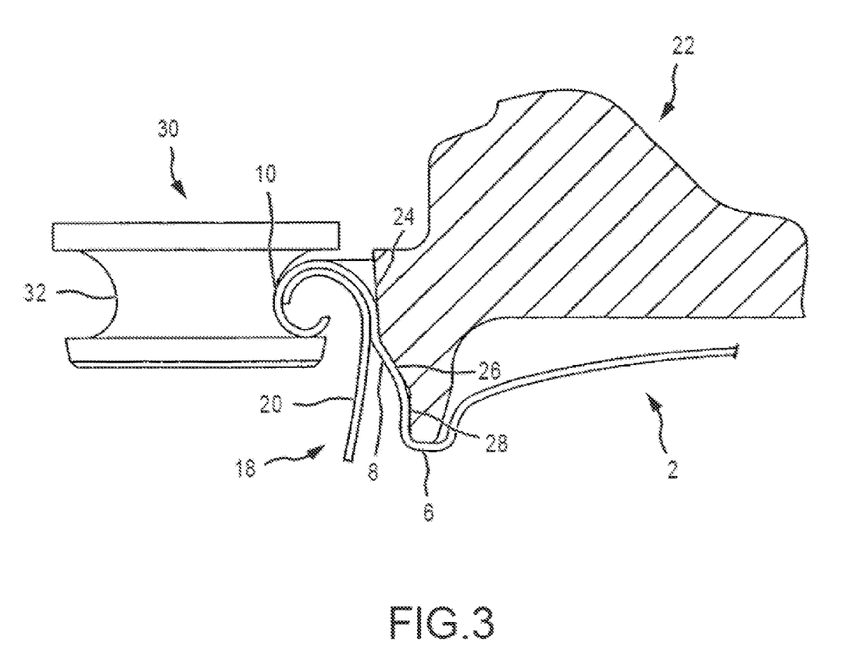
FIG. 3 is a side elevation view of the metallic end closure of FIG. 1, a chuck, and a first roller of a seamer.

Referring now to FIG. 3, the process of double seaming the end closure 2 to a container body 18 is provided. A seamer may produce a double seam between the end closure 2 and the container body 18, wherein the seamer comprises a chuck 22, a first roller 30, a second roller 34, and a platform or base. The end closure 2 is secured in the chuck 22, which has a first surface 24, a second surface 26, and a third surface 28. The first surface 24 engages the upper portion of the chuck wall 8, and the first surface 24 may taper inward at an angle between approximately 0 and approximately 10 degrees from a vertical axis of the chuck 22. The second surface engages the lower portion of the chuck wall 8, and the third surface 28 extends downward and engages the countersink 6.

A container body 18 is disposed below the end closure 2 and the chuck 22, and the uppermost portion of the container body 18 is the neck 20. Before the double seaming process, the container body 18 may be filled with a beverage, foodstuffs, or any other content discussed elsewhere herein. Then, the container body 18 may be disposed on a platform or base plate underneath the chuck 22 and the end closure 2. The container body 18 and the end closure 2 may then be pressed together such that the inner surface of the neck 20 contacts the outer surface of the chuck wall 8.

Next, the first roller 30 may be disposed proximal to the contact between the neck 20 and the chuck wall 8. The first roller 30 may have a first roller radius 32, which in this embodiment is generally concave. The chuck wall 8 and the platform or base that supports the container body 18 may begin to rotate about a common axis. The first roller 30 may move inwardly and contact the outer surface of the peripheral curl 10. As, the first roller 30 moves inwardly, the first roller radius 32 causes the peripheral curl 10 to continue to curl around towards the outer surface of the neck 20. In addition, the first roller radius 32 causes the inner surface of the neck 20 to curl along the outer surface of the peripheral curl 10.

Figure 4:
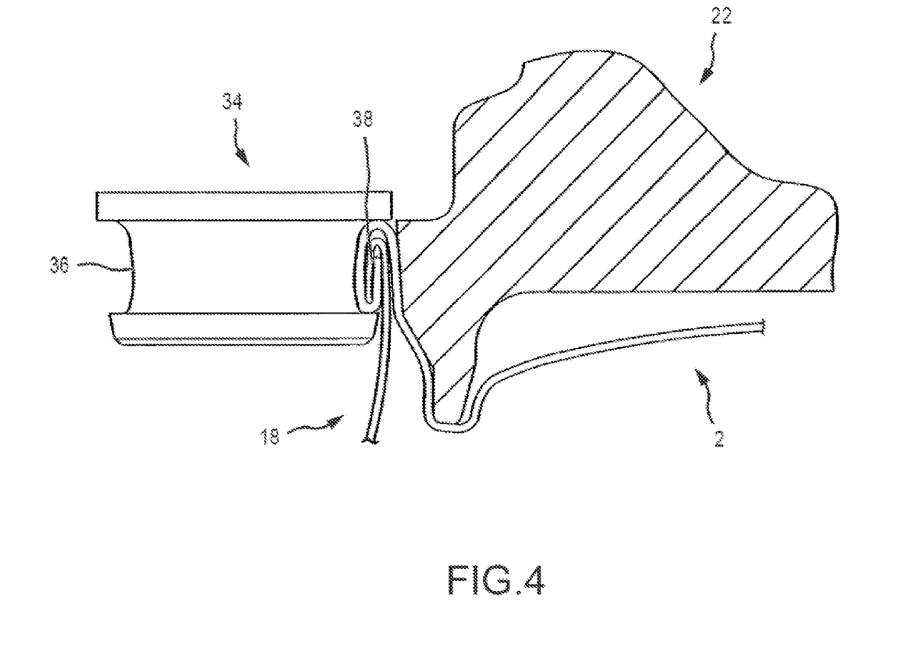
FIG. 4 is a side elevation view of the metallic end closure of FIG. 1, a chuck, and a second roller of the seamer.

Referring now to FIG. 4, the second roller 34 with a second roller radius 36 is provided. The second roller radius 36 is concave like the first roller radius 32, but the second roller radius 36 has a larger radius of curvature. As the second roller 34 moves inwardly, the second roller radius 36 causes the peripheral curl 10 and the neck 20 to press together and form a double seam 38. When viewed from the side elevation view of FIG. 4, the double seam 38 comprises three layers of the peripheral curl 10 and two layers of the neck 10. The double seam 38 joins the end closure 2 and the container body 18 to form a complete container, which is hermetically sealed with a beverage, foodstuffs, or other contents discussed elsewhere herein.

One skilled in the art will appreciate that the embodiment of seamer depicted in FIGS. 3 and 4 is exemplary in nature. For example, in one embodiment, the seamer may comprise only a single roller, or three or more rollers. In other embodiments, the rollers may be disposed at an angle from the vertical axis of the chuck 22. Angled rollers are described in more detail in U.S. Pat. No. 5,066,580, which is incorporated herein in its entirety by reference.

Further, embodiments of seamers may incorporate additional features such as seaming material, which may be disposed between the peripheral curl 10 and the neck 20 such that when the double seam 38 is formed the seaming material creates a more substantial seal between the interior and exterior of the container. Further examples of seamers may be found in U.S. Pat. Nos. 5,027,580; 5,320,469; and 7,399,152; all of which are incorporated herein in their entirety by reference.

Figure 5:
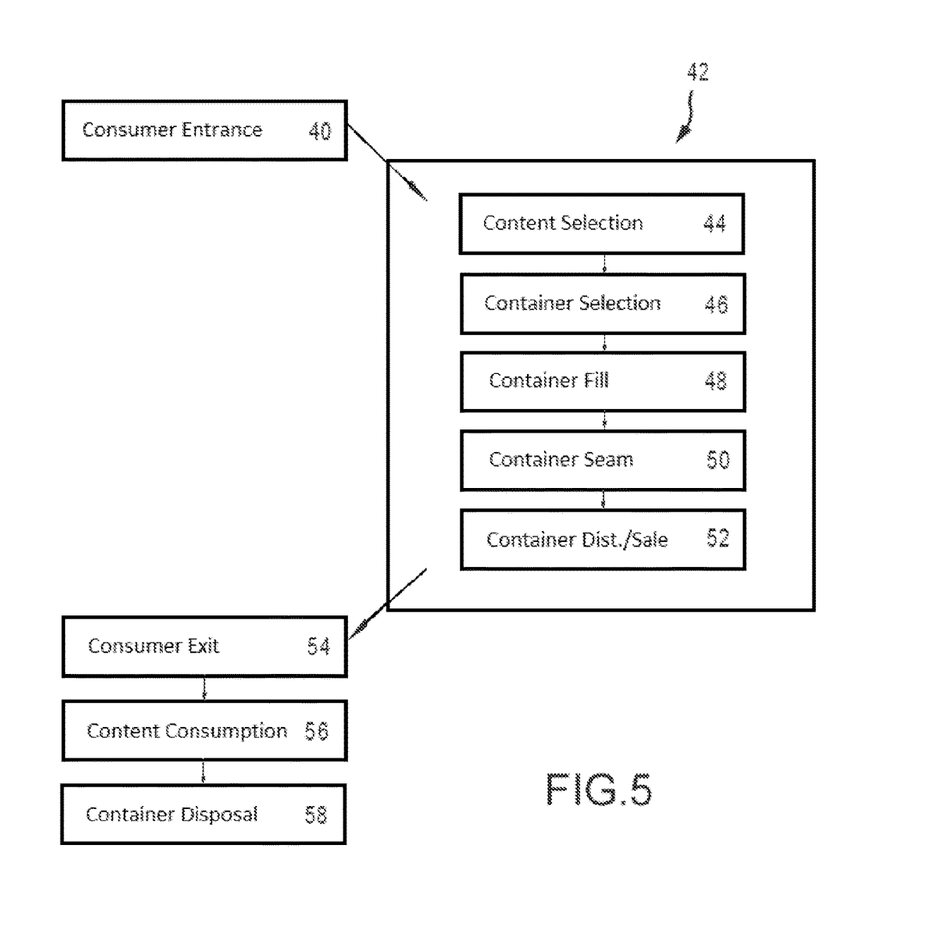
FIG. 5 is a flowchart of operations performed in accordance with embodiments of the present invention wherein some steps are performed at a single location.

Referring now to FIG. 5, a flowchart of one embodiment of the present invention is provided. To begin, a consumer makes an entrance 40 to a first location 42, which may be a bar with taps, stools, and a seamer. Next, the consumer selects which content 44 he or she would like to purchase. The consumer may make the request to an attendant or may simply make a content selection 44 for himself or herself. If the consumer is in a bar, the content may be a beverage such as an IPA. An additional step not shown in FIG. 5 may be a verification step, where an attendant or device may verify a characteristic of the user such as the age of the user if the user is attempting to purchase an alcoholic beverage.

The consumer then makes a container selection 46, wherein the container may take on a variety of sizes, shapes, and/or materials. In preferred embodiments, the container is comprised of metal. However, one skilled in the art will appreciate alternative embodiments wherein the material of a container is not metallic. For example, the material can be any material that may be secured to an end closure to hermetically seal the contents therein. Like the content selection 44, the consumer may make the request for the container selection 46 to an attendant at the first location 42, and the consumer may choose the container for its desired properties. After the content selection 44 and the container selection 46, the container is filled 48 with contents such as beverages or foodstuffs. The container filling 48 may be performed by an attendant or the consumer.

One skilled in the art will appreciate alternative embodiments of the present invention wherein the container is filled 48 with a content besides a beverage. For example, fruits, vegetables, red meats, seafood, poultry, dairy, beans, soup, salsa, nuts, freeze dried foods, or any other foodstuff that may be preserved in a hermetically sealed environment will find an advantage in the present invention.

Once the container has been filled with the appropriate content, the container is seamed 50. As described above, in a preferred embodiment, an end closure 2 is double seamed onto a container body 18 to form a hermetically sealed container. In other embodiments, the container seaming 50 may be a triple seam, an interference fit, a compression fit, a weld, a snap-on, or any other type of interconnection. In addition, a seam may have a variety of power sources such as manual, electric, pneumatic, hydraulic power, etc. Upon completion of the container seaming 50, the container may be distributed and sold 52 to the consumer, after which the consumer may exit 54 the first location 42.

After the consumer has exited the first location 42, he or she may consume 56 the contents of the container and dispose 58 of the container. The end closure 2 that is seamed onto the container body 18 may comprise a pull tab and a tear panel. In this configuration, the consumer pivots the pull tab and opens the tear panel such that the consumer has broken the hermetic seal of the container, and the consumer has access to the contents of the container. Further, the end closure 2 and the container body 18 may be comprised of a single, metallic material such as aluminum. This allows a consumer to easily dispose 58 of the container such as in a recycling bin.

Figure 6:
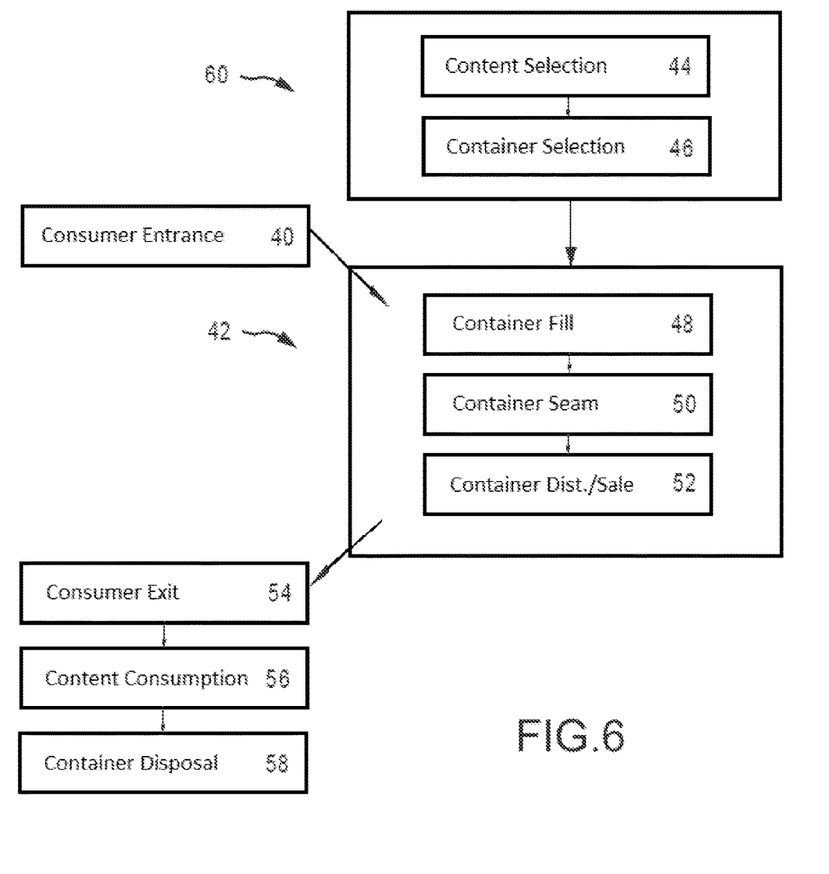
FIG. 6 is a flowchart of operations performed in accordance with embodiments of the present invention wherein some steps are performed in two locations.

Referring now to FIG. 6, an embodiment of the present invention with multiple locations is provided. Some embodiments of the present invention may include steps or actions that are preformed in different locations. In some locations the consumer may have issues trying to reach the first location 42. A bar may be busy during a weekend or an event, or a store may be having a sale. In any event, it may be advantageous to perform some steps in an alternative location.

In the embodiment depicted in FIG. 6, the consumer makes the content selection 44 and the container selection 46 at a second location 60. This leaves the filling 48, seaming 50, and distribution and sale 52 steps at the first location 42. Thus, the consumer need not spend as much time at the first location 42 if he or she is under a time constraint or the first location 42 is simply too busy.

The second location 60 may be any location other than the first location. For example, the second location 60 may simply be at the back of a busy bar or restaurant. In other words, the second location 60 may be in the same building or room as the first location 42. In other embodiments, the second location 60 may be a car, a home, a place of business or work, a place of manufacture, or any other location.

The communication between the second location 60 and the first location 42 may comprise a number of forms. In one embodiment, a consumer in the second location 60 may make a verbal or visual communication to an attendant in the first location 42. After this communication, the attendant fills the container 48 and seams an end closure 2 on to a container body 18 to form a hermetically sealed container. The consumer may enter 40 the first location 42 for the distribution and sale 52 of the container, then exit 54 the first location 42 and consume 56 the content of the container and dispose 58 of the container. In other embodiments, an electronic device such as a cell phone may be used to complete one or more steps of the present invention. One skilled in the art will appreciate that the various steps or actions of embodiments of the present invention may be performed in any order. For example, the consumer may enter 40 the first location 42 only for the distribution and sale 52 of the container, or the consumer may enter 40 the first location 42 to view the filling 48 and seaming 50 steps to assure the quality of the process.

Figure 7:
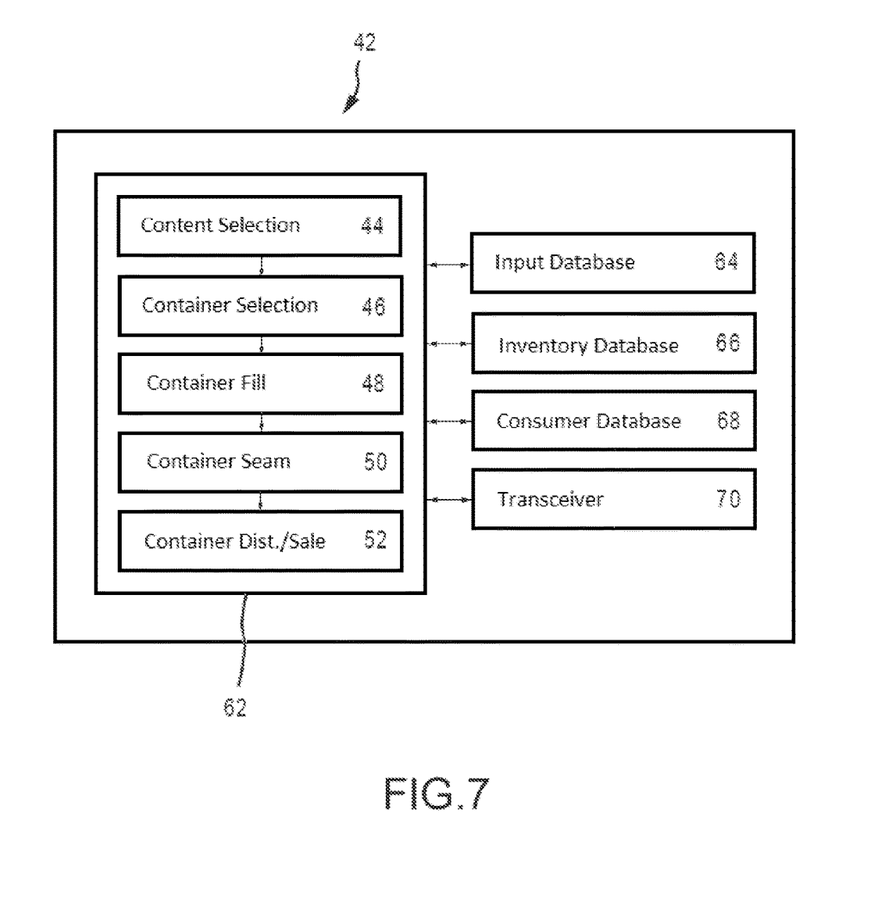
FIG. 7 is a flowchart of operations performed in according with embodiments of the present invention incorporating an electronic device.

Referring now to FIG. 7, an electronic device 62 may be provided. As mentioned elsewhere herein, an attendant is not required for all embodiments of the present invention. In some embodiments, the electronic device 62 and an associated computer interface allow a consumer to accomplish the steps and actions that an attendant would otherwise carry out. In addition, a computer interface and the electronic device 62 may provide benefits beyond what an attendant can provide such as data aggregation, data mining, and modeling.

In the embodiment depicted in FIG. 7, steps may be carried out on a electronic device 62, which may be in communication with an input database 64 and/or an inventory database 66. The electronic device 62 may also be in communication with a consumer database 68 and/or a transceiver 70.

The computer interface and the electronic device 62 may be any number of items that aid in implementation of the present invention. The computer interface may be any CRT monitor, LCD screen, LED, screen, plasma screen, AMO-LED, OLED, keyboard, mouse, touch screen, or any other device or devices commonly used in the art to send and receive inputs from the electronic device 62. In turn, the electronic device 62 can include a desktop computer, a laptop computer, a cloud computing client, a hand-held computing device, a tablet computer, a notebook computer, a phone, a personal digital assistant, a fax machine, or other type of computing device known to those of skill in the art. The electronic device 62 can include a processor, a memory, a computer interface, software, and a transceiver 70. In alternative embodiments, the electronic device 62 may include fewer, additional, and/or different components. The memory, which can include any type of permanent or removable computer memory known to those of skill in the art, can be a computer-readable storage medium. The memory can be configured to store software and an application configured to run the software, captured data, and/or other information and applications as known to those of skill in the art. The transceiver 70 of the electronic device 62 can be used to receive and/or transmit information through a wired or wireless network as known to those of skill in the art. The transceiver 70, which can include a receiver and/or a transmitter, can be a modem or other communication component known to those of skill in the art.

The input database 64 can include data related to the content selection 46, container selection 46, among other steps or actions. As mentioned elsewhere herein, the user may choose from a variety of selections to fill the container 18. The input database 64 keeps a record of these inputs, and the input database 64 may arrange these inputs in a hierarchical fashion such that the inputs may be arranged by liquid or solid, by type of food, by attributes such as sweetness, by allergic qualities, by alcoholic content, by fungibility, by color, by bitterness, by structure, by texture, by viscosity, by pH value, by carbonation, by astringency, or any other discriminatory parameter known in the art.

The inventory database 66 can include data on currently held beverage inputs, food inputs, preservative inputs, and other inputs. The data can include internal information and information about suppliers. In one illustrative embodiment, the data includes the amount of a particular type of beverage stored in a tank. The collected data can be stored in the inventory database 66. The data can also include information about the cost of inventory and timing of deliveries and planned use. The inventory database 64 can also include quantity, cost, and type information for other inputs such as packaging.

The consumer database 68 can include various data on consumer demand and preferences. For example, consumer demand data can include consumer survey results and sales results. The consumer survey results and sales results can be used to build customer liking and demand models. Consumer data may also be built up over time with consumers' inputs to the computer interface and the electronic device 62. The consumer data may include entries for time of day or year, the weather, the lighting where the computer interface or electronic device 62 is located, the noise level measured in decibels where the computer interface or electronic device 62 is located, etc.

A quick selection feature may be derived from the data accumulated in the consumer database 68 or any other source of data. The quick selection feature may be included on a subset of the computer interface such as a touch screen. The quick selection feature provides a plurality of options that a computer model or software generates based on popularity. For example, a computer model may predict that based on the weather outside and the time of day that a particular beverage will be popular because it has been popular in the past. The quick selection feature will provide this particular beverage as an option on the initial page of the touch screen such that a consumer will not have to negotiate a hierarchy of discriminatory parameters to reach the popular beverage.

An individualized content and/or container profile may also be provided for a specific consumer. The electronic device 62 may acquire aggregate consumer data, but it may also acquire individual consumer data. For example, an embodiment of the present invention may include a content selection step 46 wherein the consumer selects a beverage or foodstuff, which may have many attributes. The beverage or foodstuff may have attributes including, but not limited to, sweetness, bulking, bitterness, structure, mouth feel, viscosity, pH value, carbonation, astringency, and ethanol levels. A computing database may assign these attributes to the various beverages or foodstuffs, track content selections over time, and tally the frequency by which the attributes of these beverages or foodstuffs are chosen.

Next, the electronic device 62 may access databases of individual consumer data to determine a consumer's preferences. Over time, the consumer may exhibit a preference for a particular attribute such as sweetness. Then, the electronic device 62 may supply a recommendation based upon those preferences, wherein the recommendation may be for an entirely new product or a modification of one of the individual's preferred products. The data described for the aggregate consumer may be applicable for the individual consumer and vice versa. Thus, an individual consumer may have different preferences at different times during the day or year, or during different types of weather. The electronic device 62 may make recommendations to the individual via a selection feature. Likewise, the electronic device 62 may collect specific attributes such texture and/or pH value in the aggregate.

The electronic device 62 may keep track of a consumer's personal preferences in a variety of ways. In one embodiment, the consumer carries a device on his or her person for the purpose of storing data or identifying the consumer to the electronic device 62 such that the electronic device 62 may store the data. In one embodiment, a card with a magnetic stripe may store basic datasets regarding the consumer, including any of the data discussed elsewhere herein or otherwise commonly known in the art. Thus, in one embodiment, the consumer makes an entrance 40, swipes his or her card comprising a magnetic stripe on the electronic device 62 or other implement associated with the electronic device 62 such as a card reader. Accordingly, the remaining steps may proceed in accordance with other embodiments discussed elsewhere herein.

In other embodiments, the consumer stores data or identifies himself or herself to a electronic device 62 via a second electronic device such as a cell phone. The cell phone may be in wireless communication with the electronic device 62 via communications technologies known in the art such as Bluetooth. The electronic device 62 may then receive data regarding the consumer's transaction history from the cell phone. In other embodiments, the cell phone simply identifies the consumer to the electronic device 62, wherein the electronic device 62 may then retrieve data regarding the consumer from a local database or a network such that the electronic device 62 has access to all of the consumer's transactions regardless of location.

An intermediate technology may be a device that reads cards with a magnetic stripe, then translates the information from the magnetic stripe to a electronic device 62. Such an intermediate device may be used to as an intermediary between a consumer's card with magnetic stripe and the electronic device 62. In one embodiment, the consumer swipes his or her card in the intermediate device, which is in electronic communication with the electronic device 62, and the electronic device 62 may proceed to pull data from the magnetic stripe or any other database. A more detailed explanation of an intermediate device such as a card reader may be found in U.S. Pat. No. 7,819,729, which is incorporated herein in its entirety by reference The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A system for selecting, choosing, filling, and seaming a foodstuff in a metallic container, comprising:
    a network configured to route information between at least two devices;
    a foodstuff database device in operable communication with said network, said foodstuff database device configured to store a list of foodstuff choices;
    a first electronic device in operable communication with said network, said first electronic device configured to receive said list of foodstuff choices from said foodstuff database device via said network, wherein said first electronic device has a quick selection feature that provides selection of a foodstuff from said list of foodstuff choices based on a set of purchaser preferences, said quick selection feature including choices for a new foodstuff or a modification of one of said purchaser preferences on an interface of said first electronic device, and wherein said first electronic device is configured to receive a purchaser input selecting said foodstuff from said list of foodstuff choices;
    a second electronic device in operable communication with said network, wherein said second electronic device is located in a distinct second location from said first electronic device, and wherein said second electronic device is configured to receive said foodstuff selection from said first electronic device via said network; and
    a container seamer located at said distinct second location, wherein a metallic container is filled with said foodstuff based on said foodstuff selection received on said second electronic device, a metallic end closure that is seamed onto said metallic container with said container seamer to hermetically seal said metallic container, and wherein said metallic container is sold and distributed to a purchaser at said distinct second location.

2. The system of claim 1, wherein said list of foodstuff choices comprises at least one of a beverage, a fruit, a vegetable, a red meat, a seafood, a poultry, a dairy, a bean, a soup, a salsa, a nut product, and a freeze dried product.

3. The system of claim 1, wherein said first electronic device is at least one of a tablet computer, a laptop computer, a notebook computer, a desktop computer, a phone, a personal digital assistant, and a fax machine.

4. The system of claim 1, wherein said list of foodstuff choices is arranged on said first electronic device by at least one discrimination parameter, wherein said at least one discrimination parameter comprises at least one of an allergic quality, an alcohol content, a color, a sweetness, a bitterness, a structure, a texture, a viscosity, a pH value, a carbonation, and an astringency.

5. The system of claim 4, further comprising a consumer database device in operable communication with said network, wherein said consumer database device stores at least one consumer parameter, comprising at least one of a time of day, a time of year, an ambient temperature, an ambient pressure, a relative humidity, a discrimination parameter, and a content input history.

6. The system of claim 1, further comprising an inventory database device in operable communication with said network, wherein said inventory database device comprises content inventory data, wherein said content inventory data comprises at least one of a SKU number, a beverage quantity, a food quantity, a preservative quantity, a supplier delivery date, and a beverage cost information.

7. The system of claim 1, wherein said network is a wireless network.

8. A system for selecting a foodstuff from a list of foodstuff choices, comprising:
    a wireless network configured to route information between at least two devices;
    a consumer database device in operable communication with said wireless network, said consumer database device configured to store a set of purchaser selections;
    a foodstuff database device in operable communication with said wireless network, said foodstuff database device configured to store a list of foodstuff choices;
    a mobile device in operable communication with said wireless network, said mobile device configured to receive said set of purchaser selections from said consumer database device via said wireless network and receive said list of foodstuff choices from said foodstuff database device via said wireless network, wherein said mobile device has a quick selection feature that provides a foodstuff from said list of foodstuff choices based on said set of purchaser selections, said quick selection feature including choices for a new foodstuff or a modification of one of said purchaser selections on a display interface of said mobile device, and said mobile device is configured to receive a purchaser input to select said foodstuff from said list of foodstuff choices;
    an electronic device in operable communication with said wireless network, wherein said electronic device is positioned in a remote location from said mobile device, and said electronic device is configured to receive said foodstuff selection from said mobile device via said wireless network; and
    an automated container seamer positioned at said remote location, wherein a metallic container is filled with said foodstuff based on said purchaser input received on said electronic device, a metallic end closure that is seamed onto said metallic container with said automated container seamer to hermetically seal said metallic container, and wherein said metallic container is sold and distributed to a purchaser at said remote location.

9. The system of claim 8, wherein each purchaser selection of said set of purchaser selections comprises at least one parameter, and wherein said quick selection feature provides said foodstuff based on said at least one parameter.

10. The system of claim 9, wherein said at least one parameter is one or more of a weather condition, a time of day, and a frequency of purchase.

11. A system for selecting, choosing, filling, and seaming a foodstuff in a metallic container at a single location, comprising:
    a network configured to route information between at least two devices;
    a foodstuff input database device in operable communication with said network, wherein said foodstuff input database device is configured to store a list of foodstuff choices;

a consumer database device in operable communication with said network, wherein said consumer database device is configured to store at least one consumer parameter;

an inventory database device in operable communication with said network, wherein said inventory database device is configured to store content inventory data;

an electronic device positioned at a first location and in operable communication with said network, said electronic device configured to:

receive said list of foodstuff choices from said foodstuff database device, receive said at least one consumer parameter from said consumer database device, and receive said content inventory data from said inventory database device via said network, wherein said list of foodstuff choices are presented on an interface of said electronic device based on said at least one consumer parameter and based on said content inventory data, and wherein said electronic device is configured to receive a user input to select a foodstuff from said list of foodstuff choices, wherein said electronic device has a quick selection feature that provides selection of a foodstuff from said list of foodstuff choices, said quick selection feature including choices for a new foodstuff or a modification of said selected foodstuff; and a seamer at said first location, wherein a metallic container is filled with said selected foodstuff based on said user input, an end closure that is seamed onto said metallic container with said seamer to hermetically seal said metallic container, and wherein said sealed metallic container is distributed and sold to a user at said first location.

12. The system of claim 11, wherein said list of foodstuff choices are arranged on said electronic device by at least one discrimination parameter, and wherein said at least one discrimination parameter comprises at least one of an allergic quality, an alcohol content, a color, a sweetness, a bitterness, a structure, a texture, a viscosity, a pH value, a carbonation, and an astringency.

13. The system of claim 11, wherein said at least one consumer parameter comprises at least one of a time of day, a time of year, an ambient temperature, an ambient pressure, a relative humidity, a discrimination parameter, and a content input history.

14. The system of claim 11, wherein said content inventory data comprises at least one of a SKU number, a beverage quantity, a food quantity, a preservative quantity, a supplier delivery date, and a beverage cost information, and wherein said at least one consumer parameter comprises at least one of a time of day, a time of year, an ambient temperature, an ambient pressure, a relative humidity, a discrimination parameter, and a content input history.

* * * * *